United States Patent [19]

Shustack

[11] Patent Number: 5,908,873
[45] Date of Patent: Jun. 1, 1999

[54] PEELABLE BONDED RIBBON MATRIX MATERIAL; OPTICAL FIBER BONDED RIBBON ARRAYS CONTAINING SAME; AND PROCESS FOR PREPARING SAID OPTICAL FIBER BONDED RIBBON ARRAYS

[75] Inventor: Paul J. Shustack, West Chester, Ohio

[73] Assignee: Borden Chemicals, Inc., Cincinnati, Ohio

[21] Appl. No.: 08/575,637

[22] Filed: Dec. 20, 1995

[51] Int. Cl.$^6$ .............. G02B 6/04; G02B 6/44; C08L 75/08; C08L 75/16

[52] U.S. Cl. .............. 522/39; 522/42; 522/44; 522/64; 522/91; 522/96; 522/97; 522/77; 522/80; 385/114; 385/115

[58] Field of Search .............. 522/96, 91, 77, 522/80, 79, 97, 39, 42, 44, 64; 385/100, 114, 115, 106, 102

[56] References Cited

U.S. PATENT DOCUMENTS

| | | | |
|---|---|---|---|
| 4,016,333 | 4/1977 | Gaske et al. | 428/447 |
| 4,116,786 | 9/1978 | Hodakowski | 204/159 |
| 4,174,307 | 11/1979 | Rowe | 204/159.19 |
| 4,176,910 | 12/1979 | Nöethe | 350/96.23 |
| 4,218,294 | 8/1980 | Brack | 204/159.13 |
| 4,288,478 | 9/1981 | Brack | 428/40 |
| 4,303,696 | 12/1981 | Brack | 427/44 |
| 4,346,145 | 8/1982 | Choi et al. | 428/389 |
| 4,472,021 | 9/1984 | Ansel et al. | 350/96.23 |
| 4,477,548 | 10/1984 | Harasta et al. | 430/14 |
| 4,514,037 | 4/1985 | Bishop et al. | 350/96.23 |
| 4,561,950 | 12/1985 | Leo | 522/91 |
| 4,592,955 | 6/1986 | Choi et al. | 428/389 |
| 4,607,084 | 8/1986 | Morris | 525/454 |
| 4,608,409 | 8/1986 | Coady et al. | 524/199 |
| 4,629,285 | 12/1986 | Carter et al. | 350/96.23 |
| 4,717,740 | 1/1988 | Hung et al. | 522/96 |
| 4,735,971 | 4/1988 | Inoue et al. | 522/42 |
| 4,740,055 | 4/1988 | Kanda et al. | 350/96.3 |
| 4,753,860 | 6/1988 | Hung et al. | 430/18 |
| 4,761,363 | 8/1988 | Hung et al. | 430/284 |
| 4,798,852 | 1/1989 | Zimmerman et al. | 522/96 |
| 4,812,489 | 3/1989 | Watanabe et al. | 522/42 |
| 4,828,349 | 5/1989 | Nakasuji | 350/96.23 |
| 4,844,604 | 7/1989 | Bishop et al. | 350/96.24 |
| 4,849,461 | 7/1989 | Lee et al. | 522/33 |
| 4,889,768 | 12/1989 | Yokoshima et al. | 428/429 |
| 4,900,126 | 2/1990 | Jackson et al. | 350/46.23 |
| 4,902,440 | 2/1990 | Takeyama et al. | 252/182.18 |
| 4,953,945 | 9/1990 | Nishimura et al. | 350/96.23 |
| 5,030,665 | 7/1991 | Lee et al. | 522/96 |
| 5,082,347 | 1/1992 | Ahasaka et al. | 385/114 |
| 5,093,386 | 3/1992 | Bishop et al. | 522/96 |
| 5,135,964 | 8/1992 | Lee et al. | 522/96 |
| 5,146,531 | 9/1992 | Shustack | 385/128 |
| 5,149,592 | 9/1992 | Wojnarowicz | 428/447 |
| 5,188,864 | 2/1993 | Lee et al. | 427/515 |
| 5,284,883 | 2/1994 | Ueno et al. | 522/79 |
| 5,300,615 | 4/1994 | Meixner et al. | 528/49 |
| 5,322,861 | 6/1994 | Tsuge et al. | 522/90 |
| 5,348,986 | 9/1994 | Chu et al. | 522/37 |
| 5,352,712 | 10/1994 | Shustack | 522/31 |
| 5,373,577 | 12/1994 | Shackleton et al. | 385/128 |
| 5,373,578 | 12/1994 | Parker et al. | 385/128 |
| 5,378,734 | 1/1995 | Inoue | 522/11 |
| 5,402,516 | 3/1995 | Blyler, Jr. et al. | 385/141 |
| 5,408,564 | 4/1995 | Mills | 385/128 |
| 5,409,740 | 4/1995 | Brann | 427/513 |
| 5,422,182 | 6/1995 | Oishi et al. | 428/373 |
| 5,444,808 | 8/1995 | Shackleton et al. | 385/128 |
| 5,446,821 | 8/1995 | Nonaka et al. | 385/128 |
| 5,457,762 | 10/1995 | Lochkovic et al. | 385/114 |
| 5,460,683 | 10/1995 | Beasley, Jr. | 156/344 |
| 5,475,038 | 12/1995 | Skoultchi | 522/96 |
| 5,502,145 | 3/1996 | Szum | |
| 5,524,164 | 6/1996 | Hattori et al. | 385/114 |

FOREIGN PATENT DOCUMENTS

| | | | |
|---|---|---|---|
| 0114982 | 8/1984 | European Pat. Off. | |
| 0157396 | 10/1985 | European Pat. Off. | |
| 0194891 | 9/1986 | European Pat. Off. | |
| 270874 | 11/1987 | European Pat. Off. | |
| 0293886 | 12/1988 | European Pat. Off. | 350/96.23 |
| 0614099 | 9/1994 | European Pat. Off. | |
| 0407004 | 8/1996 | European Pat. Off. | |
| 60-170810 | 9/1985 | Japan | 350/96.23 |
| 6113208 | 1/1986 | Japan | 350/96.23 |
| 6147912 | 3/1986 | Japan | 350/96.23 |
| 6173114 | 4/1986 | Japan | |
| 61-249008 | 11/1986 | Japan | 350/96.23 |
| A63-275619 | 4/1987 | Japan | |
| 281109 | 11/1988 | Japan | |
| 63-264713 | 11/1988 | Japan | 350/96.23 |
| 63-281109 | 11/1988 | Japan | 350/96.23 |
| A01153710 | 6/1989 | Japan | |
| 2096343 | 10/1982 | United Kingdom | 350/96.23 |
| 2184563 | 6/1987 | United Kingdom | |
| WO 94/16350 | 7/1994 | WIPO | |
| WO94/16350 | 7/1994 | WIPO | |
| WO9705515 | 2/1997 | WIPO | |

OTHER PUBLICATIONS

Desolite® 950–700 and Desolite® 950–701 sales records: Record of Sales to Hua Eng Wire and Cable by SDM NV; Record of Sales to BICC by DSM NV; Record of Sales to Alcoa (Alcatel), Pirelli etc. provided by DSM NV, Jul. 6, 1988.

Description of Desolite® 950–700 and 3036–114E, Description of Desolite® 950–701 and 950–080.

Material Safety Data Sheet of DC 1248.

*Primary Examiner*—Susan W. Berman
*Attorney, Agent, or Firm*—Roylance, Abrams, Berdo & Goodman, L.L.P.

[57] ABSTRACT

A one-part, cured, radiation-curable liquid matrix composition for affixing coated and inked optical fibers in a ribbon configuration which is peelable from the coated and inked fibers without damage to the integrity of itself or the fibers is disclosed. The composition comprises an aliphatic urethane acrylate oligomer; a reactive monomer having one or more acrylate or methacrylate moieties; a release agent; and an optional photoinitiator. Also disclosed are an optical fiber ribbon array prepared therefrom; a process for removing such matrix composition from inked and coated fibers; a process for preparing such ribbon array; and a radiation-curable coating composition generally applicable for coating a substrate.

22 Claims, No Drawings

PEELABLE BONDED RIBBON MATRIX MATERIAL; OPTICAL FIBER BONDED RIBBON ARRAYS CONTAINING SAME; AND PROCESS FOR PREPARING SAID OPTICAL FIBER BONDED RIBBON ARRAYS

BACKGROUND OF THE INVENTION

The present invention relates to radiation-curable compositions useful as bonded ribbon matrices for optical fiber; to optical fiber ribbon arrays containing such matrices; and to processes for preparing such matrix-containing bonded ribbon arrays.

Optical glass fibers have revolutionized the telecommunications industry. The result has been a tremendous growth in demand for optical fibers which are free of many of the susceptibilities inherent to them.

Immediately after drawing, glass fibers are exceptionally strong and have very few intrinsic defects. However, such pristine fibers are very easily flawed by exposure to environmental conditions including dust and moisture. Therefore, there have been attempts to develop in the prior art numerous coatings which are capable of protecting the underlying glass fiber from external harmful forces and which optimally possess properties rendering them capable of obviating one or more of the various potential problems which may deleteriously effect optical fiber performance. Such properties include, inter alia, a glass transition temperature rendering the fiber useful over a large potential temperature use range; a higher refractive index than that of the fiber to refract any errant light signals away from the fiber; rapid cure, e.g., under ultraviolet irradiation; and high impermeability to moisture which may damage the coating or the fiber itself and may cause delamination of the two. Additionally, the adhesion level between the fiber and the coating must be optimized so that the coating will remain attached to the fiber during use but be easily stripped therefrom, with minimal damage to the integrity of the fiber and the coating, so that the fibers may be easily spliced in the field. Above all, the fiber coatings should display good thermal, oxidative and hydrolytic stability, to protect the underlying fiber over the long term, i.e., over twenty-five years' time.

In certain applications, such as in short haul, fiber-to-the-home uses, a single, coated optical fiber may adequately transmit a signal from one point to another. However, in most embodiments, a relatively large number of fibers are necessary to transmit a large volume of signals. For example, in the telecommunications industry, aggregates of fibers spanning oceans or continents and containing dozens of individual fibers may be required. Fibers are conveniently aggregated into cables, wherein large numbers of coated optical fibers are laid in parallel and are protected by a common sheathing material such as a layered arrangement which may include fiberglass, steel tape and reinforced rubber cabling material.

When numerous individual coated optical fibers are aggregated into a cable, it is necessary to be able to identify each of the individual fibers. For example, when two cable segments are to be spliced together, it is necessary to splice together ends of each like optical fiber in order for a signal to convey properly. When only a few fibers are contained in a cable, identification may be adequately made by having the coating of each individual fiber be a characteristic color; thus, the splicer may simply match up green fiber to green fiber, red to red, and so forth.

However, when the cable contains one hundred or more fibers, it may become impracticable to use a sufficient number of distinctive inks as to color each fiber distinguishably. Thus, a geometric means of distinguishing each fiber is used. For example, arranging the fibers in an array containing a number of layers, each layer containing perhaps twelve ink-coated fibers of different respective colors, will greatly facilitate the task of matching up fibers when splicing.

One practical way by which such spatial ordering of numerous fibers may be accomplished is to create a fiber array which is two-dimensional, wherein fibers are situated in a generally planar arrangement within a given array, with the fibers in the array disposed in parallelism with each other. These arrays are stacked one atop another in a three-dimensional structure.

Such arrays are known in the art as ribbons. For example, it is known to prepare a two-dimensional ribbon array by forming a "sandwich" of parallel coated optical fibers between two sheets of adhesive-coated Mylar tape, thus affixing the fibers in that configuration. This "sandwich" provides structural integrity and a tack free exterior surface.

However, this arrangement is less than optimal because the tape occupies a substantial proportion of the total volume of the sandwich, so that when several "sandwiches" are stacked to form a cable, an undesirably high proportion of the total cable volume is taken up by tape (rather than by optical fiber).

Thus, it has been envisioned to prepare an optical fiber ribbon array having a matrix in which the optical fibers are embedded in the desired generally planar, parallel arrangement. This matrix should, inter alia, have suitable glass transition temperature; cure rapidly; be non-yellowing; and have high thermal, oxidative and hydrolytic (moisture) stability.

However, currently available matrix materials possess a number of deficiencies which in the past have defied solution. First of all, it is a difficult if not paradoxical problem to devise a matrix composition which is adherent enough to maintain the integrity of an optical fiber array, yet not so strongly adherent that it will either remove some of the ink coating from the underlying coated and inked fiber when removed, or leave vestiges of itself upon the coated and inked fiber after it is stripped away. Removal of the ink from a coated, inked fiber is referred to in the industry as "breakout failure"; it can make identification of the once color-coded fibers difficult or impossible.

While matrix compositions are currently available which can be softened to leave an intact, inked coated optical fiber, these typically have the inconvenience of requiring application of a solvent (e.g., an alcohol gel), waiting at least ten minutes for the matrix to soften, and then peeling or scraping away the matrix. Beyond the convenience factor, vulnerability of the coated fiber to the solvent becomes a factor as well.

In other prior art situations, particulate release agents such as polytetrafluoroethylene (TEFLON®) particles have been either applied as separate coating layer to coated and inked fibers or incorporated into a matrix to confer strippability. However, use of particulates (which must be used in relatively large amounts) is highly undesirable because it makes application of the liquid composition difficult, and because settling of the particulate material in the liquid composition may occur. Also, stress concentration and other factors relating to the cured matrix composition which can be detrimental to the underlying fiber may result. Moreover, optical clarity may be compromised. Furthermore, in the case where the particulate is added as another coating layer, an additional, costly step is required to first treat the inked fiber with release agent.

In still other prior art situations, a complex, expensive mechanical stripping apparatus is required to remove the matrix composition. Use of such complex skill-requiring and expensive apparatus is, of course, undesirable.

Furthermore, it is a less than optimal situation if the matrix composition, even though eventually removable with its own and the ink layer's integrity intact, is removable in anything other than an intact unit. One can readily envision the inconvenience of peeling off bits and pieces of a matrix composition, not unlike removing from a roll a length of "scotch tape" which has split, broken or fragmented.

SUMMARY OF THE INVENTION

It has now been found that a one-part, liquid optical fiber matrix composition can be formulated which overcomes each of the aforedescribed deficiencies. It is formulated to possess a specially balanced combination of properties which allow it to be a "full peel" matrix which may be readily and cleanly peeled from a coated and inked optical fiber surface, optimally in one intact unit without the need for chemical solvents or mechanical apparatus, without use of detrimental materials or particulates, without the need to first apply a separate release coating, and without damage to the ink interface between itself and the coated and inked optical fiber.

Accordingly, the invention provides, in one embodiment, a radiation-curable liquid matrix composition for affixing coated and inked optical fibers in a ribbon configuration, said liquid matrix composition comprising: (A) from about 20.0 percent to about 90.0 percent by weight of a wholly aliphatic urethane acrylate oligomer; (B) from about 5.0 percent to about 50.0 percent by weight of a reactive monomer having one or more acrylate or methacrylate moieties per monomer molecule; (C) from about 0.05 percent to about 15.0 percent by weight of a release agent; and (D) from about 0 percent to about 10 percent by weight of a photoinitiator; all of said percentages by weight being based on total weight of (A), (B), (C) and (D); wherein the composition is substantially free of n-vinyl pyrrolidone; wherein the composition, when cured, has a tensile modulus at 25° C. of about 10,000 to about 200,000 psi or higher (about 70 MPa to about 1,400 MPa); wherein the composition, when cured, has an elongation to break of at least 20%; wherein the composition, when cured, is strippable, without being dissolved, from the ink on the inked and coated fibers and substantially without removing the ink from the fibers; and wherein the composition, when cured, is substantially free of particulate material.

In another embodiment, the invention is an optical fiber array comprising a plurality of coated, ink-colored optical fibers in a desired, fixed configuration, e.g., a generally planar, generally parallel arrangement and a one-part, cured liquid radiation-curable bonding matrix composition in which the fibers are embedded. The inked and coated optical fibers are disposed in a desired relationship to each other, to form a unitary structure, which structure is produced by arranging the fibers in the desired relationship, applying the liquid matrix composition to the fibers to embed them therein, then curing the liquid composition by exposure to curing radiation. The matrix composition has the desirable property of being substantially free of particulate material and of being easily strippable from the fibers without loss of integrity of the ink coating upon the fibers and also without use of solvents or complicated stripping apparatus.

In still another embodiment, the invention is a process for preparing an optical fiber array. The process comprises mechanically aligning the optical fibers in the desired (e.g., generally parallel) arrangement; applying about the fibers the matrix composition described above; and curing the matrix composition to secure the fibers in the desired arrangement, e.g., preferably with ultraviolet light or an electron beam.

In a still further embodiment, the invention is a process for removing a cured matrix from an optical fiber array, preferably as a unitary structure, without damage to the underlying fibers.

DESCRIPTION OF THE PREFERRED EMBODIMENTS

PEELABLE BONDED RIBBON AND PEELABLE MATRIX COMPOSITION

The invention relates in part to a radiation-curable liquid matrix composition, e.g., for affixing coated and inked optical fibers in a ribbon or other desired configuration. The matrix composition, when cured, should have, inter alia, the following properties: moisture resistance; solvent resistance; extreme ease of stripping; resistance to breakout failure; low volatiles, extractibles and exudate content; absence of particulate material; absence of components which are harmful to human beings or to the cured composition; fast cure when irradiated; and long term thermal, oxidative and hydrolytic stability. It should be non-yellowing. It must be somewhat hard-curing, must have a high elongation to break, and must have superb release properties. It must, when cured, be strippable from the underlying fibers without being dissolved and without removing ink from the underlying fibers. It should also be resistant to failure during "cabling". Cabling is the term used to describe a process of gathering a plurality of the ribbons together to form a cable.

The matrix material contains at least three basic, essential ingredients, and, if envisioned for ultraviolet cure, at least four:

(a) a wholly aliphatic urethane acrylate;
(b) one or more monomers reactive therewith;
(c) a release agent; and
(d) optionally, for a U.V.-curable composition, a photoinitiator.

ESSENTIAL INGREDIENTS

A. The Urethane Acrylate Oligomer

The first ingredient is a wholly aliphatic urethane acrylate oligomer. Preferably, it is based on an aliphatic polyether polyol, which is reacted with an aliphatic polyisocyanate and acrylated. Alternatively, it may be based on any backbone which does not adversely affect the cured coating. Other suitable examples of backbones include hydrocarbon polyols, polycarbonate polyols, polyisocyanate polyols, and mixtures of these. However, polyether polyol backbones are preferred, because, in general, they have good solvent resistance and are relatively inexpensive.

This component is chosen to confer good thermal and hydrolytic properties on the cured coating, and to be somewhat non-yellowing.

The wholly aliphatic urethane acrylate oligomer comprises from about 20 percent to about 90 percent by weight of the matrix material (composition), based on the total weight of the (A) through (D) ingredients. Preferably, the (A) component comprises from about 30 percent to about 80 percent, and more preferably about 50 percent to about 75 percent by weight of the composition based upon the total weight of the (A) through (D) ingredients. If less than about 20 percent by weight of this component is used, flexibility, elongation to break and overall toughness will suffer. If more than about 90 percent by weight is used, the viscosity of the composition may be undesirably high and thus make application of the liquid matrix material difficult unless special provisions, such as heating the application die, are made.

The wholly aliphatic oligomer (A) utilized in the present invention is the reaction product of (i) an aliphatic polyol; (ii) an aliphatic polyisocyanate; and (iii) an endcapping monomer capable of supplying a reactive terminus.

The polyol (i) may be an aliphatic polyol which does not adversely affect the properties of the composition when cured. Examples again include polyether polyols; hydrocarbon polyols; polycarbonate polyols; polyisocyanate polyols; and mixtures thereof. Polyols which should be limited or preferably excluded include polyester or epoxy backbones.

The oligomeric component may contain very small amounts of urethane acrylates based on polyesters, but preferably contains only the above kinds of oligomers, for optimal long term stability.

A representative polyether polyol is based on a straight chain or branched alkylene oxide of from one to about twelve carbon atoms. The polyether polyol may be prepared by any method known in the art. Preferably, it has a number average molecular weight ($M_n$), as determined by vapor pressure osmometry (VPO), per ASTM D-3592, sufficient to give the entire oligomer based on it a molecular weight of not more than about 6,000 daltons, preferably not more than about 5,000 daltons, and more preferably not more than about 4,000 daltons. Such polyether polyols include but are not limited to polytetramethylene polyol, polymethylene oxide, polyethylene oxide, polypropylene oxide, polybutylene oxide, and mixtures thereof.

Representative hydrocarbon polyols which may be used include but are not limited to those based on a linear or branched hydrocarbon polymer of from 600 to 4,000 molecular weight such as fully or partially hydrogenated 1,2-polybutadiene; 1,2-polybutadiene hydrogenated to an iodine number of from 9 to 21; and fully or partially hydrogenated polyisobutylene. Unsaturated hydrocarbon polyols are not desirable because the oligomers made from them, when cured, are susceptible to oxidation.

Representative polycarbonate polyols include but are not limited to the reaction products of dialkyl carbonate with an alkylene diol, optionally copolymerized with alkylene ether diols.

The polyisocyanate component (ii) is non-aromatic. Oligomers based on aromatic polyisocyanates effect yellowing in the cured coating. Non-aromatic polyisocyanates of from 4 to 20 carbon atoms may be employed. Suitable saturated aliphatic polyisocyanates include but are not limited to isophorone diisocyanate; dicyclohexylmethane-4,4'-diisocyanate; 1,4-tetramethylene diisocyanate; 1,5-pentamethylene diisocyanate; 1,6-hexamethylene diisocyanate; 1,7-heptamethylene diisocyanate; 1,8-octamethylene diisocyanate; 1,9-nonamethylene diisocyanate; 1,10-decamethylene diisocyanate; 2,2,4-trimethyl-1,5-pentamethylene diisocyanate; 2,2'-dimethyl-1,5-pentamethylene diisocyanate; 3-methoxy-1,6-hexamethylene diisocyanate; 3-butoxy-1,6-hexamethylene diisocyanate; omega, omega'-dipropylether diisocyanate; 1,4-cyclohexyl diisocyanate; 1,3-cyclohexyl diisocyanate; trimethylhexamethylene diisocyanate; and mixtures thereof. Very small amounts of aromatic polyisocyanates may be used; however, long term stability on aging may suffer somewhat.

The reaction rate between the hydroxyl-terminated polyol and the diisocyanate may be increased by use of a catalyst in the amount of 100 to 200 ppm. Suitable catalysts include but are not limited to dibutyl tin dilaurate, dibutyl tin oxide, dibutyl tin di-2-hexoate, stannous oleate, stannous octoate, lead octoate, ferrous acetoacetate, and amines such as triethylamine, diethylmethylamine, triethylenediamine, dimethylethylamine, morpholine, N-ethyl morpholine, piperazine, N,N-dimethyl benzylamine, N,N-dimethyl laurylamine, and mixtures thereof.

The endcapping monomer (iii) may be one which is capable of providing at least one reactive terminus and which preferably provides acrylate or methacrylate termini. Suitable hydroxyl-terminated compounds which may be used as the endcapping monomers include but are not limited to hydroxyalkyl acrylates or methacrylates such as hydroxyethyl acrylate, hydroxyethyl methacrylate, hydroxypropyl acrylate, hydroxypropyl methacrylate, hydroxybutyl acrylate, hydroxybutyl methacrylate, and so forth.

A particularly preferred endcapping monomer is hydroxyethyl acrylate or hydroxyethyl methacrylate.

The molar ratio of the polyol, diisocyanate and endcapping monomer is preferably approximately 1:2:2.

Some commercially available oligomers which are suitable for the (A) component of this invention include but are not limited to the following:

1. PHOTOMER® 6008 from Henkel Corporation, Ambler, Pa., aliphatic urethane acrylate oligomer from polyether polyol, dicyclohexyl methane diisocyanate, and hydroxyethyl acrylate. The oligomer has a number average molecular weight of about 1,500 daltons. It is sold as a solution of the oligomer in tripropylene glycol diacrylate as diluent.

2. PHOTOMER® 6019, also from Henkel Corporation, completely analogous to the above but based on isophorone diisocyanate rather than dicyclohexyl methane diisocyanate.

3. PHOTOMER® 6010, also from Henkel Corporation, aliphatic urethane oligomer from polyether polyol, dicyclohexyl methane diisocyanate, and hydroxyethyl acrylate in trimethylolpropane triethoxy triacrylate diluent. It has a number average molecular weight of about 1,500 daltons.

4. Sartomer CN 983, aliphatic urethane acrylate oligomer based on a saturated hydrocarbon polyol and having an average acrylate functionality of 2.0, from Sartomer Company, Exton, Pa.

5. Sartomer CN 985, also a hydrocarbon polyol-based aliphatic urethane acrylate oligomer, and having an average acrylate functionality of 2.3, also from Sartomer Company.

6. Sartomer CN 980 and 981, both polyether-backboned aliphatic urethane acrylates, also from Sartomer Company.

7. Echo Resins ALU-350 series resins, i.e., 350, 351, 352, 353 and 354, from Echo Resins and Laboratory, Versailles, Mo., all polytetramethylene polyol-based acrylated aliphatic urethane oligomers of increasing molecular weight and viscosity and decreasing modulus with increasing number in the series. Certain physical properties for this series of resins are summarized below:

|  | ALU-350 | ALU-351 | ALU-352 | ALU-353 | ALU-354 |
|---|---|---|---|---|---|
| Density @ 20° C. | | | | | |
| (g/cm³) | 1.052 | 1.048 | 1.027 | 1.019 | 1.019 |
| (lbs/gal) | 8.76 | 8.73 | 8.55 | 8.49 | 8.49 |
| Refractive Index | 1.496 | 1.492 | 1.478 | 1.468 | 1.460 |
| Viscosity | | | | | |
| @ 78° F. (cps) | 320,000 | 120,000 | wax | wax | wax |
| @ 140° F. (cps) | 7,300 | 5,400 | 8,900 | 21,750 | 30,000–40,000 |

-continued

|  | ALU-350 | ALU-351 | ALU-352 | ALU-353 | ALU-354 |
|---|---|---|---|---|---|
| Color, Gardner | <1 | <1 | <1 | <1 | <2 |
| Functionality | 2 | 2 | 2 | 2 | 2 |
| Percent Shrinkage, Cured | 3.6 | 2.8 | 1.7 | 1.3 | 1.1 |
| Number Average Molecular Weight | 1,390 | 1,410 | 2,300 | 3,550 | 4,880 |

In general, the lower molecular weight members of the series are preferred because they are less waxy and easier to work with, and because the compositions including them swell less when contacted with solvents which they may encounter.

The methacrylate equivalents of these oligomers are equally suitable.

8. PURELAST® aliphatic urethane acrylate oligomers based on polyether backbones, available from Polymer Systems Corporation, Orlando, Fla. Suitable PURELAST® oligomers include 566, 566A, 569, 569A, 586, 586A, 590, 590A, 595, 595A, 597, 597A, 598 and 598A. This series of oligomers increases in modulus with increasing number in the series. These oligomers are either difunctional (no suffix) or monofunctional ("A" suffix). All of these oligomers are sold neat, except for 597A and 598A, which include 7% and 10% isobornyl acrylate, respectively. Particularly preferred from this group are PURELAST® 590, 595, 597 and 598 because they provide high modulus cured matrices.

Methacrylate analogs of these oligomers are suitable as well.

9. BR-372, BR-543, BR-571, BR-582, all polyether-backboned aliphatic urethane acrylates, from Bomar Specialties, Winsted, Conn.

10. EBECRYL® 8800, EBECRYL® 270, and EBECRYL® 4826 oligomers, all from UCB Chemicals Corporation, Smyrna, Ga., all aliphatic urethane diacrylate oligomers based on polyethers.

EBECRYL® 8800 oligomer is diluted 10% with ethoxyethoxyethyl acrylate; has a viscosity at 65° C. of 8,000–18,000 cps and a Gardner Color Index of 2 max. Its density is 8.75 pounds per gallon; its theoretical molecular weight is 1,700. When cured it has a tensile strength of 3,150 psi; a tensile elongation of 83%, and a glass transition temperature of 48° C.

EBECRYL® 270 oligomer, previously sold as EBECRYL® 4826 oligomer, contains no diluent monomer; has a viscosity of 2,500–3,500 cps at 60° C. and a Gardner Color Index of 2 max. Its density is 8.91 pounds per gallon; its theoretical functionality is 2 and its theoretical molecular weight is 1,500. When cured it has a tensile strength of 1,200 psi; a tensile elongation of 87% and a glass transition temperature of –27° C.

Methacrylate equivalents of these oligomers may also be used.

11. UVITHANE® ZL-1178 oligomer from Morton Thiokol, Inc., Morton Chemical Division, Princeton, N.J., polyether based aliphatic urethane acrylate. This oligomer has a viscosity of 55–75 poises at 120° F. and 700–800 poises at 78° F. and, when cured neat, has a tensile strength of 325 psi and an ultimate elongation of 45%.

The methacrylate analog of this monomer may be used as well.

12. EBECRYL® 4842, which is a silicone-modified polyether-based aliphatic urethane acrylate, sold neat, and Ebecryl 19-6264, which is not silicone-modified, but which is a polyether-based aliphatic urethane acrylate and which contains about 15% by weight of 1,6-hexanediol diacrylate as a reactive solvent, both from UCB Chemicals Corporation, Smyrna, Ga.

13. Hydrocarbon polyol-based aliphatic urethane acrylate oligomers such as are disclosed in U.S. Pat. No. 5,146,531, issued to Applicant. The content of that patent is expressly incorporated herein by reference. These oligomers are based on a linear or branched hydrocarbon polymer of from 600 to 4,000 molecular weight such as fully or partially hydrogenated 1,2-polybutadiene; 1,2-polybutadiene hydrogenated to an iodine number of from 9 to 21; and fully or partially hydrogenated polyisobutylene.

14. UV-530, from Echo Resins and Laboratory, Versailles, Mo., aliphatic urethane acrylate oligomer based on polyisocyanate, the oligomer being of approximate molecular weight 2500.

15. Furthermore, any aliphatic urethane acrylate or methacrylate oligomer of the type exemplified above is believed to be suitable so long as the desirable properties of the claimed composition are not adversely effected.

The cured matrix material containing the oligomer of this invention has a water absorption value of less than about 5% by weight, and preferably less than about 3%. Furthermore, the material should swell less than 40% in length, and preferably, at least in some embodiments, less than about 10% in length, when soaked in gasoline for about 4 hours at room temperature.

B. The Reactive Monomer

The second essential component of the composition is a reactive monomer having one or more acrylate or methacrylate moieties per monomer molecule, and which is one which results in a hard curing (high modulus) coating, of suitable viscosity for application conditions. The monomer is capable of lowering the viscosity of the overall liquid composition to within the range of about 1,000 to about 20,000 cps (centipoises) at 25° C., preferably about 1,500 to about 15,000 cps, and more preferably about 2,000 to about 10,000 cps, as measured by a Brookfield Viscometer, Model LVT, spindle speed #34, at 25° C. If a viscosity higher than about 20,000 cps results, the liquid matrix system including the monomer may be used if certain processing modifications are effected, e.g., heating the dies through which the liquid matrix is applied.

The monomer may be mono-, di- or tri-functional, though mono- and di-functional monomers are preferred because they give formulations which, when cured, tend to have higher elongation to break values. The monomer may be straight- or branched-chain alkyl; cyclic; or partially aromatic. It may also comprise a combination of monomers which, on balance, result in a suitably low-viscosity liquid which cures to form a hard, elongatable material.

The monomer component comprises between about 5.0 to about 50.0 percent by weight of the liquid composition, preferably between about 10.0 to about 45.0 percent by weight, and more preferably between about 15.0 to about 40.0 percent by weight, based on the weight of components (A), (B), (C) and (D). It is important that the polyfunctional content of the monomer component (B) be low enough that flexibility is not impaired; in most, but not all, cases this establishes an upper limit of about 10.0% by weight of the polyfunctional monomer, based on the total weight of (A), (B), (C) and (D). However, the true upper limit is set by the resulting flexibility and elongation of the matrix composition including it when cured. Generally, but not always, if more than 10.0% by weight of polyfunctional monomer is used, flexibility may suffer due to brittleness. Alternatively, the composition may include 0% polyfunctional content.

As regards the total amount of the monomer component (B) (i.e., mono- and poly-functional), if less than about 5.0 percent of the (B) component is used, the viscosity of the liquid matrix composition may be too high for easy application to the coated and inked fibers.

Suitable as the monomer component (B), within the limits discussed above, include monomers having a plurality of acrylate or methacrylate moieties. These may be di-, tri-, tetra- or penta-functional, but are preferably difunctional, in order to increase the crosslink density of the cured coating and therefore to increase modulus without causing brittleness. Examples of suitable polyfunctional monomers useful as (B) include but are not limited to $C_6$–$C_{12}$ hydrocarbon diol diacrylates or dimethacrylates such as 1,6-hexanediol diacrylate and 1,6-hexanediol dimethacrylate; tripropylene glycol diacrylate or dimethacrylate; neopentyl glycol diacrylate or dimethacrylate; neopentyl glycol propoxylate diacrylate or dimethacrylate; neopentyl glycol ethoxylate diacrylate or dimethacrylate; and mixtures thereof.

Further suitable examples of (B) monomers include, but are not limited to, aromatic-containing monomers such as phenoxyethyl (meth) acrylate, phenoxyethyl ethoxylate (meth)acrylate; phenoxyethyl propoxylate(meth)acrylate; or one of the monomers known to adjust the refractive index of a composition including it. Combinations including one or more of these are suitable as well. Such monomers belonging to the later category are disclosed and described in the '531 patent of Applicant previously incorporated by reference and may, for example, contain (1) an aromatic moiety; (2) a moiety providing a reactive (eg , acrylic or methacrylic) group; and (3) a hydrocarbon moiety.

Samples of aromatic monomers additionally containing hydrocarbon character and a vinyl group include but are not limited to polyalkylene glycol nonylphenylether acrylates such as polyethylene glycol nonylphenylether acrylate or polypropylene glycol nonylphenylether acrylate; polyalkylene glycol nonylphenylether methacrylates such as polyethylene glycol nonylphenylether methacrylate or polypropylene glycol nonylphenylether methacrylate; and mixtures of these.

Such monomers are, for example, available from Toagosei Chemical Industry Company, Ltd., Tokyo, Japan under the trade name ARONIX® M111, M113, M114 and M117, and from Henkel Corporation, Ambler, Pa., under the trade name PHOTOMER® 4003.

Other suitable monomers additionally include hydrocarbon alkyl acrylates or methacrylates which are either straight chain or branched, and may contain 8 to 18 carbon atoms in the alkyl moiety such as acrylates and methacrylates such as isooctyl methacrylate; octyl acrylate; octyl methacrylate; decyl acrylate; decyl methacrylate; isodecyl acrylate; isodecyl methacrylate; lauryl acrylate; lauryl methacrylate; tridecyl acrylate; tridecyl methacrylate; palmitic acrylate; palmitic methacrylate; stearyl acrylate; stearyl methacrylate; cetyl acrylate; cetyl methacrylate; and mixtures of the above. Of these, cetyl, lauryl and stearyl acrylates or methacrylates are most desired. While many of the above-listed shorter chain monofunctional monomers are suitable, they are not preferred, because they tend to have less than optimized elongation and cured compositions including them may come off less cleanly than others.

Also suitable are cyclic monomers such as isobornyl (meth)acrylate; dicyclopentenyl(meth)acrylate; dicyclopentenyl ethoxylate (meth)acrylate; tetrahydrofurfuryl acrylate; tetrahydrofurfuryl methacrylate; and mixtures thereof. These cyclic monomers tend to yield compositions which have high elongation to break values; may cure hard; and perform well on aging but may adhere too well to the inked substrate for optimized removal, making adjustments to the balance of the composition (such as use of a higher amount of release agent (C)) necessary to compensate.

Monomers which are unsuitable include hydrophilic ones such as n-vinyl pyrrolidone and n-vinyl formamide. N-vinyl pyrrolidone, which has in the past been widely used in optical fiber coating applications, is particularly undesirable because it is hydrophilic and, on long term water soaking, confers very poor water resistance. Moreover, it has been found recently to be carcinogenic. Thus, the composition should be substantially free of this monomer.

Preferred monomers include phenoxyethyl (meth)-acrylate alone or in combination with 1,6-hexanediol di(meth)acrylate (HDODA), or the refractive-index modifying type monomers as disclosed herein, alone or in combination with a straight chain hydrocarbon alkyl (meth) acrylate such as stearyl acrylate. More preferred is a combination of phenoxyethylacrylate and 1,6-hexanediol diacrylate, in a ratio of about 5:1.

C. The Release Agent

Also essential to the composition of the invention is one or more components which contribute to the release properties of the cured composition from the inked substrate when cured. Unlike some prior art applications, the release agent is intimately admixed with the other components of the matrix, conferring a "one-part" homogenous system.

An essential characteristic of the release agent is that it is not in particulate form because the overall matrix composition is to be substantially free of particulate material. By "substantially free of particulate material" is meant that, per gram of liquid sample, less than or equal to 10 particles of 5–25 micron size, less than or equal to 2 particles of 25–50 micron size, and less than or equal to 1 particle of 50 microns or greater are detectible, as determined by laser particle count.

The release agent (C) may comprise either nonreactive or reactive components, or a combination of the two.

Suitable reactive release agent components include, but are not limited to, acrylated silicones such as TEGMER® 2100, 2200, 2500 and 2600, all from Goldschmidt Chemical Corporation, Tego Chemie Service USA, Hopewell, Va. and BYK® 371 acrylic-functional polyester-modified dimethyl siloxane from BYK-Chemie USA, Wallingford, Conn.; EBECRYL® 350 acrylated silicone from UCB Chemicals Corporation, Smyrna, Ga.; and combinations thereof. Methacrylated equivalents of any of the above are suitable as well. Also included in this category are other suitable reactive species including vinyl-functional and mercapto-functional silicones, as well as acrylate-functional, methacrylate-functional, vinyl-functional and mercapto-functional fluorocarbons. Such reactive release agent components bind in with the other reactive components of the matrix composition during cure.

When reactive release agent components are used, between about 0.1 and about 15.0 percent, preferably between about 0.25 and about 10.0 percent, by weight, based on the weight of the (A) through (D) components, is used.

Suitable nonreactive release agent components include, but are not limited to, silicone copolymers such as the surfactants SILWET® L-7602 and L-7604 alkyl-pendant silicone copolymers and COATOSIL™ 3500, 3501 and 3573 silicone copolymers, all from OSi Specialties, Incorporated, Danbury, Conn.; DC-57 silicone copolymer from Dow Corning Corporation, Midland, Mich.; and combinations thereof. Also suitable are hydrocarbon release agents which include, but are not limited to, paraffin or microcrystalline wax or other nonparticulate material, or non-reactive fluorocarbons.

When nonreactive release agent components are used, they are employed in a relatively minor amount of the composition, i.e., between about 0.05 and about 2.0 percent, preferably between about 0.1 and about 1.0 percent by weight, based on the weight of the (A) through (D) components.

Overall, if less than about 0.05 percent of the release agent (C) is used, adhesion may be too high and poor release and poor peelability may result. If more than about 15.0 percent of the (C) component is used, as when reactive release agents are used, however, incompatibility in the liquid and resultant imperfections in the cured matrix composition may result.

It is highly desirable that, when a nonreactive release agent is employed, it is effective in a small amount, i.e., preferably less than 2.0 percent of the composition, to keep amounts of volatiles, extractibles and exudates in the cured composition as low as possible.

Silicone release agents are preferred because they improve coefficient of friction, which is helpful for ease of spooling and cabling.

A preferred release agent is a combination of a nonreactive release agent such as an alkyl-pendant silicone copolymer and a reactive release agent such as an acrylate functional polyester-modified dimethyl siloxane, in a ratio of about 1:4, or a (reactive) acrylated silicone alone.

D. The Photoinitiator

The fourth component of the matrix composition is a photoinitiator. The necessity for this component depends on the envisioned mode of cure of the matrix composition: if it is to be ultraviolet cured, a photoinitiator is needed; if it is to be cured by an electron beam, the material may comprise substantially no photoinitiator.

In the ultraviolet cure embodiment, the photoinitiator, when used in a small but effective amount to promote radiation cure, must provide reasonable cure speed without causing premature gelation of the matrix composition. Further, it must not interfere with the optical clarity of the cured matrix material. Still further, the photoinitiator must itself be thermally stable, non-yellowing, and efficient.

Suitable photoinitiators include, but are not limited to, the following: hydroxycyclohexylphenyl ketone; hydroxymethylphenylpropanone; dimethoxyphenylacetophenone; 2-methyl-1-[4-(methylthio)phenyl]-2-morpholinopropanone-1; 1-(4-isopropylphenyl)-2-hydroxy-2-methylpropan-1-one;1-(4-dodecylphenyl)-2-hydroxy-2-methylpropan-1-one;4-(2-hydroxyethoxy) phenyl-(2-hydroxy-2-propyl) ketone; diethoxyacetophenone; 2,2-di-sec-butoxyacetophenone; diethoxy-phenyl acetophenone; bis (2,6-dimethoxybenzoyl)-2,4-, 4-trimethylpentylphosphine oxide; 2,4,6-trimethylbenzoyldiphenylphosphine oxide; 2,4,6-trimethylbenzoylethoxyphenylphosphine oxide; and mixtures of these.

The photoinitiator comprises from about 0 percent to about 10.0 percent by weight of the composition, based upon the weight of the composition, based upon the weight of composition of the (A) through (D) ingredients (0 percent representing the nonultraviolet-cure embodiment). In the ultraviolet curable embodiment, the photoinitiator comprises from about 0.5 percent to about 10.0 percent by weight of the composition, based on (A) through (D). Preferably, the amount of photoinitiator, when used, is from about 1.0 percent to about 6.0 percent, based upon the total weight of the (A) through (D) ingredients. A particularly preferred photoinitiator is hydroxycyclohexylphenyl ketone, such as is supplied by Ciba-Geigy Corp., Ardsley, N.Y., as IRGACURE® 184.

The photoinitiator should be chosen such that cure speed, as measured in a dose versus modulus curve, of less than 1.0 J/cm$^2$, and preferably less than 0.5 J/cm$^2$, is required, when the photoinitiator is used in the designated amount.

OPTIONAL INGREDIENTS

The matrix material may also comprise one or more optional ingredients, discussed infra.

One optional class of components includes various stabilizers or antioxidants (E). To improve shelf life (storage stability) of the uncured coating, as well as to increase thermal and oxidative stability of the cured coating, one or more stabilizers or antioxidants may be included in the composition. Examples of suitable stabilizers include tertiary amines such as diethylethanolamine and trihexylamine; hindered amines; organic phosphites; hindered phenols; mixtures thereof; and the like. Some particular examples of antioxidants which can be used include propionates such as octadecyl-3-(3',5'-di-tert-butyl-4'-hydroxyphenyl) propionate and hydrocinnamates such as thiodiethylene bis (3,5-di-tert-butyl-4-hydroxy) hydrocinnamate and tetrakis [methylene (3,5-di-tert-butyl-4-hydroxyhydrocinnamate)] methane.

When a stabilizer or antioxidant is used, it may be incorporated in an amount from about 0.1 percent to about 2.0 percent by weight, based on the weight of the (A) through (D) ingredients. Preferably, it is included in the range from about 0.5 percent to about 1.5 percent by weight, based on the total weight of the (A) through (D) ingredients. Desirable properties of a stabilizer or antioxidant include non-migration (probably enhanced by low polarity). A preferred antioxidant is thiodiethylene bis (3,5-di-tert-butyl-4'-hydroxy) hydrocinnamate, such as IRGANOX® 1035, from Ciba-Geigy Corporation, Ardsley, N.Y.

PROPERTIES OF THE COMPOSITION OF THE INVENTION

The uncured composition as defined herein should have a viscosity at 25° C. of between about 1,000 and about 20,000 centipoises, preferably between about 1,500 and about 15,000 centipoises, and more preferably about 2,000 to about 10,000 centipoises, as measured at 25° C. using a Brookfield viscometer, model LVT, at 6 rpm, #34 spindle.

The matrix material which is prepared and cured in accordance with the invention should have a tensile modulus at 25° C. of about 10,000 psi to about 200,000 psi (about 70 MPa to about 1,400 MPa); preferably about 25,000 psi to about 175,000 psi (about 170 MPa to about 1,200 MPa); and more preferably about 40,000 to about 150,000 psi (about 275 to about 1,000 MPa) (per ASTM D-882); a glass transition temperature of less than about 110° C. (peak); an elongation to break of at least 20% and preferably at least 40% (per ASTM D-882); tensile (rupture) strength of at least about 1,000 psi, preferably at least about 2,000 psi, (per ASTM D-882); good release from ink (i.e., generally requiring about 1–2 grams or so of force to perform a 180° peel test as described hereinbelow); low surface tack; fast cure; and high thermal, oxidative and hydrolytic stability over the long term.

The above-described combination of high modulus and high elongation to break is believed to be a factor which results in a coating which does not fragment when peeled away from the fiber, in the preferred embodiment as an intact, unitary structure, resulting in a "full peel" matrix material which may be thus removed easily and completely without first dissolving it.

THE OPTICAL FIBER BONDED RIBBON ARRAY

The invention further relates to an optical fiber bonded ribbon array. The optical fiber array generally comprises a plurality of inked and coated optical fibers embedded and secured in a desired configuration, e.g., in a parallel and planar or other prescribed arrangement, and a one-part cured liquid radiation curable matrix composition, in which the fibers are embedded. The inked and coated optical fibers are disposed in a desired relationship to each other, to form a unitary structure, which structure is produced by arranging the fibers in the desired relationship, applying the liquid matrix composition to the fibers to embed them therein, then curing the liquid composition by exposure to curing radiation. The matrix composition, when cured, adheres to the fibers during use but is easily strippable therefrom, preferably in an intact unit, without substantially damaging the integrity of an ink layer on the coated optical fibers and without the need to first dissolve or soften it with solvent.

The optical fibers which are part of the ribbon array are those known in the art which are singly or dually coated before being bonded in the matrix composition and which contain an ink layer on their surface, rendering each distinguishable from other fibers in the ribbon.

The optical fibers which are coated may comprise, for example, a glass core and a glass cladding layer. The core, for example, may comprise silica doped with oxides of germanium or phosphorous and the cladding, a pure or doped silicate such as a fluorosilicate. Alternately, the fibers may comprise a polymer clad silica glass core. Examples of such polymer claddings include organosiloxanes such as polydimethylsiloxane or a fluorinated acrylic polymer.

The fiber coatings are of the type known in the art and preferably are radiation-, e.g., ultraviolet light-, cured. The coating compositions may comprise a single or a dual layer and often contain cured acrylate or methacrylate components such as urethane diacrylates. A suitable secondary coating, for example, may comprise a polyester urethane acrylate oligomer; isobornyl acrylate; a photoinitiator; and a stabilizer.

As discussed hereinabove, in order for the optical fiber ribbons to be spliced in a reasonably easy manner, it is desirable to identify the individual fibers by color coding them. It is possible to add a coloring agent to the outermost fiber coating layer; however, this is impractical because the coating will impart its color to the apparatus used to apply it, requiring numerous sets of drawing and coating apparatuses to accommodate each color of ink used.

Thus, it is more efficacious to ink over the optical fiber coating or coatings ink-containing layers of different colors, for individual fiber identification, by any means known in the art. The applied ink composition may be variable in nature but generally is vinylic and may comprise either a radiation-cure system or a solvent-based system, and may include, for example, one or more organic or inorganic pigments; a vinyl copolymer; synthetic silica; and, optionally, an organic solvent. The precise nature of the ink composition will dictate the amounts and nature of the adhesion-affecting components in the matrix.

The cured matrix composition which bonds the fibers is of the type which constitutes the present invention, i.e., one which comprises the cured product of: (A) from about 20.0 percent to about 90.0 percent by weight of a wholly aliphatic urethane acrylate oligomer; (B) from about 5.0 percent to about 50.0 percent by weight of a reactive monomer having one or more acrylate or methacrylate moieties per monomer molecule; (C) from about 0.05 percent to about 15.0 percent by weight of a release agent; and (D) from about 0 percent to about 10 percent by weight of a photoinitiator; all of said percentage by weight being based on total weight of (A), (B), (C) and (D), wherein the composition is substantially free of n-vinyl pyrrolidone; wherein the composition, when cured, has a tensile modulus at 25° C. of about 10,000 to about 200,000 psi (about 70 MPa to about 1,400 MPa); wherein the composition, when cured, has an elongation to break of at least 20%; wherein the composition, when cured, is strippable without being dissolved from the ink on the inked and coated fibers and substantially without removing the ink from the fibers; and wherein the composition, when cured, is substantially free of particulate material.

One kind of ribbon structure, and an optical fiber array from such ribbon, is described in U.S. Pat. No. 4,900,126 to Jackson et al., which is incorporated herein by reference.

PROCESS FOR PREPARING AN OPTICAL FIBER BONDED RIBBON ASSEMBLY

The invention comprises, in a further aspect, a process for preparing an optical fiber bonded ribbon assembly. Broadly, the process comprises mechanically aligning coated and inked fibers in a desired (i.e., generally planar and generally parallel) disposition relative to each other; applying a liquid matrix composition about the fibers; and curing the liquid matrix composition, thereby securing the fibers in the desired disposition.

A suitable but non-limitative means for applying the liquid matrix composition to the fibers is as follows. Optical fibers which have been coated and subsequently inked over in the manner described hereinabove or in any manner known in the art may be used. The optical fibers may be mechanically arranged in the desired configuration (e.g, in a generally parallel, generally planar disposition relative to each other). The liquid matrix composition may be applied about the fibers by any conventional means, i.e., by dipping the fibers into a vat of the material or pouring or extruding the matrix material thereupon, or by applying the matrix material via a pressurized die. Once the liquid matrix composition has been applied substantially uniformly about the fibers, it may be radiation cured, preferably either by ultraviolet light irradiation or via electron beam. Optionally, the resulting composite may be flipped over, more matrix composition applied thereto, and the matrix again cured as above. The resulting ribbon contains the fibers bonded and secured in the desired disposition (i.e., generally parallel and generally planar).

PROCESS FOR REMOVING A BONDED RIBBON MATRIX COMPOSITION FROM A COATED AND INKED OPTICAL FIBER PRESENT IN AN OPTICAL FIBER ARRAY

In another aspect, the invention comprises a process for removing a bonded ribbon matrix composition from a coated and inked optical fiber present in an optical fiber array, such that the matrix composition is removed without damage to the integrity of itself or an underlying coated and inked fiber, the matrix composition comprising the cured reaction product of (A) from about 20.0 percent to about 90.0 percent by weight of a wholly aliphatic urethane acrylate oligomer; (B) from about 5.0 percent to about 50.0 percent by weight of a reactive monomer having one or more acrylate or methacrylate moieties per monomer molecule; (C) from about 0.05 percent to about 15.0 percent by weight of a release agent; and (D) from about 0 percent to about 10 percent by weight of a photoinitiator; all of the percentage by weight being based on total weight of (A), (B), (C) and (D), wherein the composition is substantially free of n-vinyl pyrrolidone; wherein the composition, when cured, has a tensile modulus at 25° C. of about 10,000 to about 200,000 psi (about 70

MPa to about 1,400 MPa); wherein the composition, when cured, has an elongation to break of at least 20%; wherein the composition, when cured, is strippable without being dissolved from the ink on the inked and coated fibers and substantially without removing the ink from the fibers; and wherein the composition, when cured, is substantially free of particulate material.

Unlike prior art matrix compositions, this composition is capable of being removed easily and cleanly, preferably as an intact unit, without need for chemical solvents or mechanical apparatus; without use of detrimental materials or particulates; and without damage to the ink interface between itself and the coated and inked optical fibers.

COATINGS FOR SUBSTRATES

Although the coating composition has been exemplified hereinabove for use as a matrix material for coated and inked optical fibers, it should be understood to be useful in any embodiment where it is desired to coat or bind a substrate (e.g., a flexible substrate) wherein the coating may be easily stripped from a substrate and particularly an ink-covered substrate. Examples of such substrates include but are not limited to inked glass, metal or plastic. For example, the inventive composition may be used as a release coating for a glass or plastic substrate having a logo printed thereon, as may be used in electronics or other industries, to identify a supplier, or in any embodiment where it is desired to temporarily protect a printed surface. For example, a logo may be protected during shipping with such a release coating, which coating may be removed by the customer. Thus, the invention, stated more broadly, is a radiation curable coating composition for coating a substrate, the coating composition comprising: (A) from about 20.0 percent to about 90.0 percent by weight of a wholly aliphatic urethane acrylate oligomer; (B) from about 5.0 percent to about 50.0 percent by weight of a reactive monomer having one or more acrylate or methacrylate moieties per monomer molecule; (C) from about 0.05 percent to about 15.0 percent by weight of a release agent; and (D) from about 0 percent to about 10 percent by weight of a photoinitiator; all of the percentage by weight being based on total weight of (A), (B), (C) and (D), wherein the composition is substantially free of n-vinyl pyrrolidone; wherein the composition, when cured, has a tensile modulus at 25° C. of about 10,000 to about 200,000 psi (about 70 MPa to about 1,400 MPa); wherein the composition, when cured, has an elongation to break of at least 20%; wherein the composition, when cured, is strippable without being dissolved from the ink on the substrate and substantially without removing the ink from the substrate; and wherein the composition, when cured, is substantially free of particulate material.

EXAMPLES

The following Examples serve to further illustrate the invention. In these Examples and elsewhere throughout this application, all parts and percentages are by weight, on a dry solids basis, and all temperatures are in degrees centigrade (OC) unless expressly stated to be otherwise. In all of the Examples, cure speeds were measured with an International Light IL 745-A radiometer with model A309 light bug. In the Examples and elsewhere in this application, the terms "modulus" and "Instron modulus" refer to tensile modulus. Also, unless otherwise specified, viscosities are measured at 25° C. using a Brookfield viscometer, model LVT, at 6 rpm, #34 spindle.

Unlike the remainder of the application, where percentages by weight refer to the total weight of the (A) through (D) components, parts by weight in the Examples refer to the total composition described in that Example, including all components, both essential and optional. The optional ingredients are identified by an asterisk (*) in the Examples. The optional components may be necessary for use, if the exemplified coating is to meet the rigorous requirements for a commercially acceptable bonding matrix for optical glass fiber ribbons arrays.

Example 1

A Matrix Composition Which Cures to Form a Full-Peel Bonded Ribbon Matrix

| Ingredient | Percent by Weight |
| --- | --- |
| PHOTOMER ® 6008 from Henkel Corp., Ambler, PA, aliphatic urethane acrylate oligomer, believed to be the reaction product of polyether polyol; dicyclohexyl methane diisocyanate and hydroxyethyl acrylate in tripropylene glycol diacrylate diluent (A) | 63.81 |
| AGEFLEX ® PEA phenoxyethylacrylate monomer from CPS Chemical Company, Inc., address Old Bridge, NJ (B) | 25.00 |
| 1,6-hexanediol diacrylate (HDODA) monomer, from UCB Chemicals Corporation, Smyrna, GA (B) | 5.00 |
| SILWET ® surfactant L-7602 alkyl-pendant (non-hydrolyzable) silicone copolymer, molecular weight 3,000, from Union Carbide Corp., Danbury, CT (C) | 0.25 |
| BYK ®-371 acrylic functional polyester modified dimethyl-siloxane, in xylene solvent, from BYK-Chemie USA, Wallingford, CT (C) | 0.94 |
| IRGACURE ®-184 hydroxy-cyclohexylphenyl ketone photoinitiator, from Ciba-Geigy, Ardsley, NY (D) | 4.00 |
| IRGANOX ®-1035 thiodiethylene bis (3,5-di-tert-butyl-4-hydroxy) hydrocinnamate antioxidant stabilizer, from Ciba-Geigy* | 1.00 |

The viscosity of the resulting (uncured) formulation, which was slightly cloudy, was 6220 cps (at 25° C. using a Brookfield viscometer, model LVT, at 6 rpm, #34 spindle), and its density was 9.28 lb/gal (1.11 g/cm$^3$). Its refractive index was 1.4977 at 25° C.

Shelf life as a function of change in viscosity over time of the uncured formulation was determined by weighing a 50 gram sample of the liquid into a 4-ounce glass jar with a lid and heating in a 200° F. (93.3° C.) oven for 16 hours. The change in viscosity was determined to be 7.9%.

The uncured matrix composition was applied to a substrate. The substrate comprised a flat glass sheet having on its surface an approximately six-to-seven mil thick radiation-cured coating overprinted with an approximately 1-mil thick ink layer. Specifically, the radiation-cured coating was a secondary coating which is commercially available in liquid form from Borden, Inc. as 9MKU70456 and is based on a urethane acrylate. After radiation cure of the liquid secondary coating, an ink coating was applied overtop this coating. The ink, which was white in color, comprised a ultraviolet cured acrylate-based fiber optic ink. It conferred white color to the coated, inked substrate.

The above described matrix composition was applied to the coated and inked substrate as an about two and one half-to-three mil coating using a Bird applicator. It was ultraviolet cured in air at 0.7 J/cm$^2$ using a 200 watts per inch medium pressure mercury vapor lamp. A sandwich comprising cured secondary coating/cured ink/cured matrix, was peeled off of the glass. This sandwich is referred to as the "drawdown".

Adhesion of the cured matrix composition was determined by a peel test conducted as follows. The drawdown sample was cut lengthwise into two, one inch strips. At its edge, a single-edge razor was used to start to peel the matrix from the ink/secondary coating portion of the drawdown. The peeled drawdown was separated manually just enough to make a tab of cured matrix to load into the top jaw of an Instron. The remaining portion (i.e., of ink/secondary coating) was loaded into the lower jaw of the Instron. The sample was pulled to perform a 180° peel measurement, and the average peel force for two samples was recorded in grams. An adhesion value of 1.90 grams of force was measured. The matrix was removed in one clean piece, without loss of integrity to itself or the ink, i.e., was a "full-peel" material.

A tensile modulus of 66,000 psi (455 MPa) at 25° C., tensile strength of about 3730 psi (25.7 MPa), elongation to break of 45.1% (per ASTM D-882) and surface tension of 26.6 dynes/cm were measured.

The cured matrix had a glass transition temperature, as determined according to ASTM D-4065 of about 48° C. (peak). It contained, on average, 16.4 particles of 5–25 micron size, 0.86 particles of 25–50 micron size, and 0.71 particles of greater than or equal to 50 micron size per gram, as determined by laser particle count. (The actual amount of particles of 5–25 micron size is believed to be lower than the reported value of 16.4, due to slight contamination of the method and apparatus used for the test. The actual number in the sample is believed to be below 10 particles of 5–25 micron size.)

Oxidative induction temperature was measured by subjecting a 10 mg sample of the coating cured as above to differential scanning calorimetry (DSC) in a pure oxygen atmosphere. The test was commenced at 100° C. and increased by 10° C. per minute until oxidation began, as evidenced by the beginning of a temperature exotherm. This point, the oxidative induction temperature, was measured at about 220° C.

Example 2

A Matrix Composition Expected to Have Excellent Peelability, High Modulus, and Having Lower Than Optimized Viscosity

| Ingredient | Percent by Weight |
| --- | --- |
| PHOTOMER ® 6019 oligomer from Henkel Corporation based on isophorone diisocyanate, but otherwise analogous to PHOTOMER ® 6008 used in Example 1 (A) | 63.81 |
| AGEFLEX ® PEA phenoxyethylacrylate monomer from CPS Chemical (B) | 25.00 |
| 1,6-hexanediol diacrylate monomer from UCB Chemicals Corporation (B) | 5.00 |
| SILWET ® L-7602 surfactant from Union Carbide (C) | 0.25 |
| BYK ®-371 siloxane from BYK-Chemie (C) | 0.94 |

| Ingredient | Percent by Weight |
| --- | --- |
| IRGACURE ®-184 photoinitiator from Ciba-Geigy (D) | 4.00 |
| IRGANOX ®-1035 antioxidant from Ciba-Geigy* | 1.00 |

This liquid composition, which was clear, had a viscosity of 2150 cps.

The cured composition had a tensile modulus according to ASTM D-882 of about 85,000 psi (about 586 MPa) and a percent elongation of about 52.1%.

Example 3

A Composition Having a Higher Viscosity Which is Expected to Have Better Peelability The identical composition to Example 2 was made up, except that different amounts of the first three components, i.e., 67.81% PHOTOMER® 6019, 22.00% phenoxyethylacrylate, and 4.0% 1,6-hexanediol diacrylate were used. It had a viscosity of 3940 cps and is expected to have tensile modulus, percent elongation and peelability within the parameters of this invention.

Example 4

A Clear-Curing Matrix Composition

Another radiation-curable composition was formulated as follows:

| Ingredient | Percent by Weight |
| --- | --- |
| PHOTOMER ® 6019 from Henkel Corp. (A) | 68.81 |
| AGEFLEX ® PEA phenoxyethylacrylate from CPS Chemical (B) | 25.00 |
| SILWET ® L-7602 surfactant from Union Carbide (C) | 0.25 |
| BYK ®-371 siloxane from BYK-Chemie (C) | 0.94 |
| IRGACURE ®-184 photoinitiator from Ciba-Geigy (D) | 4.00 |
| IRGANOX ®-1035 antioxidant from Ciba-Geigy* | 1.00 |

1,6-hexanediol diacrylate was omitted from the coating of Example 2 to make this composition.

This composition was prepared and tested as in Example 1 above. It had a viscosity of 6070 cps, and, after cure, a 25° C. tensile modulus of about 103,000 psi (710 MPa), percent elongation of 49.2% and rupture strength of about 3800 psi (25 MPa).

A laser particle count revealed, on average, 5.5 particles of 5 to 25 micron size; 0.48 particles of 25 to 50 micron size; and 0.95 particles of greater than 50 micron size.

A peel test as conducted in Example 1 gave a value of 2.2 g. While this matrix did not release quite as well as did the composition of Example 1, it was still well within the parameters of the invention.

Example 5

Another Composition Having Adequate Peelability

The following formulation was made up to show the effect of employing a combination of oligomers netting a higher modulus and higher Tg.

| Ingredient | Percent by Weight |
| --- | --- |
| PHOTOMER ® 6008 from Henkel Corp. (A) | 43.87 |
| SARTOMER CN 983 ® from Sartomer Company Exton, PA, aliphatic urethane acrylate oligomer based on a saturated hydrocarbon polyol and containing an average acrylate functionality of 2.0 (A) | 21.94 |
| AGEFLEX ® PEA phenoxyethylacrylate monomer from CPS Chemical (B) | 25.00 |
| 1,6-hexanediol diacrylate monomer from UCB Chemicals Corporation (B) | 3.00 |
| SILWET ® L-7602 surfactant from Union Carbide (C) | 0.25 |
| BYK ®-371 siloxane from BYK-Chemie (C) | 0.94 |
| IRGACURE ®-184 from Ciba-Geigy (D) | 4.00 |
| IRGANOX ®-1035 antioxidant from Ciba-Geigy* | 1.00 |

The uncured coating formulated as described had a viscosity of 5780 cps.

A tensile modulus of about 136,000 (938 MPa) was measured, as well as an elongation of 32.3% and tensile strength of about 4,570 psi (31.5 MPa). Its peel properties were well within the parameters of the invention.

A laser particle count revealed, on average, 58.5 particles of 5 to 25 micron size; 0.33 particles of 25 to 50 micron size; and no particles of greater than 50 microns. The large number of small particles is very likely attributable to contamination, rather than to the intrinsic level of particulate material.

Example 6

A Lower Modulus Matrix Also Having Good Peel Properties

A liquid composition identical to the one described in Example 1 was prepared except that it had a higher proportion of phenoxyethyl acrylate and a lower proportion of 1,6-hexanediol diacrylate as the (B) component (i.e., 27.50% phenoxyethylacrylate and 2.50 1,6-hexanediol diacrylate). When cured, a tensile modulus of 58,700 psi (about 400 MPa); percent elongation of 53.8; and tensile strength of about 3950 psi (27.2 MPa); were observed. A laser particle count revealed, on average, 4.0 particles of 5 to 25 micron size; 0.095 particles of 25 to 50 micron size; and 0.29 particles of greater than 50 micron size.

Example 7

A Lower Modulus Composition

The following formulation was made up:

| Ingredient | Percent by Weight |
| --- | --- |
| PHOTOMER ® 6008 from Henkel Corp. (A) | 60.00 |
| AGEFLEX ® PEA phenoxyethylacrylate monomer from CPS Chemical (B) | 33.81 |
| SILWET ® L-7602 surfactant from Union Carbide (C) | 0.25 |
| BYK ®-371 siloxane from BYK-Chemie USA (C) | 0.94 |
| IRGACURE ®-184 photoinitiator from Ciba-Geigy (D) | 4.00 |
| IRGANOX ®-1035 antioxidant from Ciba-Geigy* | 1.00 |

The uncured coating had a viscosity of 4,150 cps.

The modulus of the coating was only 10,400 psi (71.7 MPa). Its elongation was 69.2%, and its tensile strength was 2800 psi (19.4 MPa).

Example 8

Another High Modulus, High Tg Matrix

The following formulation was made up:

| Ingredient | Percent by Weight |
| --- | --- |
| PHOTOMER ® 6010, from Henkel Corporation, aliphatic urethane acrylate oligomer from polyether polyol, dicyclohexyl methane diisocyanate and hydroxyethyl acrylate in trimethyolpropane triethoxy triacrylate diluent (A) | 29.50 |
| SARTOMER ® CN 983 from Sartomer Company, Exton, PA, aliphatic urethane diacrylate based on a saturated hydrocarbon polyol (A) | 40.00 |
| AGEFLEX ® PEA phenoxyethylacrylate from CPS Chemical (B) | 25.00 |
| TEGMER-2100 acrylated silicone from Goldschmidt Chemical Corporation, Hopewell, VA (C) | 0.50 |
| IRGACURE ®-184 from Ciba-Geigy (D) | 4.00 |
| IRGANOX ®-1035 from Ciba-Geigy* | 1.00 |

The uncured coating had a viscosity of 5,210 centipoises.

When cured in the manner described in previous Examples; had a tensile modulus of 90,000 psi (about 620 MPa); a rupture strength of 3656 psi (about 25 MPa); and percent elongations, based on four consecutive pulls, of 39.3%, 25.4%, 42.2% and 29.3%. It peeled very satisfactorily from the substrate on which it was cured, though it was slightly more difficult to remove than the coating of Example 1.

Example 9

A Matrix Composition Which is Expected To Cure Very Hard and Peel Very Well

The following ingredients were mixed together:

| Ingredient | Percent by Weight |
| --- | --- |
| PURELAST ® 595 difunctional aliphatic urethane acrylate oligomer based on polyether backbone, from Polymer Systems Corp., Orlando, FL (A) | 64.50 |
| AGEFLEX ® PEA phenoxyethylacrylate from CPS Chemical (B) | 30.00 |
| TEGMER 2100 acrylated silicone from Goldschmidt Chemical Corporation (C) | 0.50 |
| IRGACURE ®-184 from Ciba-Geigy (D) | 4.00 |
| IRGANOX ®-1035 from Ciba-Geigy* | 1.00 |

This liquid composition had a viscosity of 21,200 cps.

Though no such data were accrued, the composition is expected to cure very hard and have good peel.

Example 10

Another Matrix Composition Expected To Peel Very Satisfactorily

The following ingredients were combined:

| Ingredient | Percent by Weight |
| --- | --- |
| PHOTOMER ® 6008 from Henkel Corporation (A) | 63.81 |
| ARONIX M114 polyethylene glycol nonylphenyl ether acrylate from Toagosei Chemical Industry Company, Ltd., Tokyo, Japan (B) | 20.00 |
| stearyl acrylate from Henkel Corporation (B) | 5.00 |
| 1,6-hexanediol diacrylate from UCB Chemicals Corporation (B) | 5.00 |
| SILWET ® surfactant L-7602 from Union Carbide (C) | 0.25 |
| BYK ®-371 siloxane from BYK-Chemie (C) | 0.94 |
| IRGACURE ®-184 from Ciba-Geigy (D) | 4.00 |
| IRGANOX ® 1035 from Ciba-Geigy* | 1.00 |

This composition had a viscosity of 13,300 cps at 25° C. It is expected to cure hard and to display excellent peelability.

Example 11

Another Matrix Composition Which is Expected to Peel Well

The following formulation was made up:

| Ingredient | Percent by Weight |
| --- | --- |
| PHOTOMER ® 6008 oligomer from Henkel Corporation (A) | 64.50 |
| AGEFLEX ® PEA phenoxyethylacrylate from CPS Chemical (B) | 25.00 |
| 1,6-hexanediol diacrylate from UCB Chemicals Corporation (B) | 5.00 |
| TEGMER 2100 acrylated silicone from Goldschmidt (C) | 0.50 |
| IRGACURE ®-184 from Ciba-Geigy (D) | 4.00 |
| IRGANOX ® 1035 from Ciba-Geigy* | 1.00 |

This composition, a liquid, had a viscosity of 7160 cps at 25° C.

When cured as described above, it has a 25° C. modulus of 112,600 psi (777 MPa); tensile strength of 4120 psi (28 MPa); elongation of 38.1% and oxidative induction temperature of 232° C.

CONCLUSION

There has thus been developed an optical fiber array containing a cured, radiation curable liquid matrix composition having a number of desirable properties. In addition to possessing excellent thermal, hydrolytic and oxidative stability; low content of volatiles, extractibles, exudates and particulates; and absence of harmful ingredients, the matrix is capable of securely holding underlying coated and inked optical fibers in a desired configuration during use, but it is superbly removable therefrom when splicing of the fibers is desired. Specifically, it is so releasable, so hard and so elongatable that, in a preferred embodiment, by slightly bending the array containing it, the cured matrix composition, when cured, composition can be snapped cleanly in two and smoothly and evenly lifted up at an angle as great as 90° and pulled off in a unitary, intact strip, without fragmentation and without removing the ink with which it was formerly contacted.

While the invention has been disclosed in this patent application by reference to the details of preferred embodiments of the invention, it is to be understood that this disclosure is intended in an illustrative rather than a limiting sense, as it is contemplated that modifications will readily occur to those skilled in the art, within the spirit of the invention and the scope of the appended claims.

What is claimed is:

1. An optical fiber array comprising
   (1) inked and coated optical fibers, and
   (2) a matrix, prepared by curing an homogenous liquid radiation-curable matrix composition, for embedding and securing therein upon curing of said composition a plurality of said inked and coated optical fibers in a desired configuration, in which said inked and coated optical fibers are disposed in a desired relationship to each other,
   said optical fiber array being produced by arranging said inked and coated optical fibers in said desired relationship, applying said liquid matrix composition to said coated optical fibers to embed them therein and then curing said liquid matrix composition by exposure to curing radiation to form a cured matrix, said liquid matrix composition comprising:
   (A) from about 20.0 percent to about 90.0 percent by weight of a wholly aliphatic urethane acrylate oligomer;
   (B) from about 5.0 percent to about 50.0 percent by weight of a reactive monomer having one or more acrylate or methacrylate moieties per monomer molecule;
   (C) an amount from about 0.05 percent to about 15.0 percent by weight of a release agent, which amount is not incompatible with said liquid matrix composition and which release agent is not in particulate form; and (D) from about 0 percent to about 10 percent by weight of a photoinitiator;

all of said percentages by weight being based on total weight of (A), (B), (C) and (D), wherein said liquid composition is substantially free of N-vinyl pyrrolidone;

wherein said cured matrix has a tensile modulus at 25° C. of about 10,000 to about 200,000 psi (about 70 MPa to about 1,400 MPa);

wherein said composition, when cured, has an elongation to break of at least 20%;

wherein said composition, when cured, is strippable, without being dissolved, from the ink on said inked and coated fibers in a substantially intact unit and substantially without removing said ink from said fibers; and wherein said composition, when cured, is substantially free of particulate material.

2. An optical fiber array according to claim 1, wherein said urethane acrylate oligomer (A) is based on polyether polyol.

3. An optical fiber array according to claim 1, wherein said reactive monomer (B) is selected from the group consisting of $C_6$–$C_{12}$ hydrocarbon diol diacrylates; $C_6$–$C_{12}$ hydrocarbon diol dimethacrylates; tripropylene glycol diacrylate; tripropylene glycol dimethacrylate; neopentyl glycol diacrylate; neopentyl glycol dimethacrylate; neopentyl glycol propoxylate diacrylate; neopentyl glycol propoxylate dimethacrylate; neopentyl glycol ethoxylate diacrylate; neopentyl glycol ethoxylate dimethacrylate; bisphenol A ethoxylate diacrylate; bisphenol A ethoxylate dimethacrylate; bisphenol A propoxylate diacrylate; bisphenol A propoxylate dimethacrylate; phenoxyethyl acrylate; phenoxyethyl methacrylate; phenoxyethyl ethoxylate acrylate; phenoxyethyl ethoxylate methacrylate; phenoxyethyl propoxylate acrylate; phenoxyethyl propoxylate methacrylate; polyethylene glycol nonylphenylether acrylate; polyethylene glycol nonylphenylether methacrylate; polypropylene glycol nonylphenylether acrylate; polypropylene glycol nonylphenylether methacrylate; isooctyl methacrylate; octyl acrylate; octyl methacrylate; decyl acrylate; decyl methacrylate; isodecyl acrylate; isodecyl methacrylate; lauryl acrylate; lauryl methacrylate; tridecyl acrylate; tridecyl methacrylate; palmitic acrylate; palmitic methacrylate; stearyl acrylate; stearyl methacrylate; cetyl acrylate; cetyl methacrylate; tetrahydrofurfuryl acrylate; tetrahydrofurfuryl methacrylate; isobornyl acrylate; isobornyl methacrylate; dicyclopentenyl acrylate; dicyclopentenyl methacrylate; dicyclopentenyl ethoxylate acrylate; dicyclopentenyl ethoxylate methacrylate; dicyclopentenyl propoxylate acrylate; dicyclopentenyl propoxylate methacrylate; and mixtures thereof.

4. An optical fiber array according to claim 1, wherein said reactive monomer (B) is phenoxyethylacrylate.

5. An optical fiber array according to claim 1, wherein said reactive monomer (B) is a combination of phenoxyethylacrylate and 1,6-hexanediol diacrylate.

6. An optical fiber array according to claim 1, wherein said release agent (C) is selected from a reactive silicone component, a nonreactive silicone component, and mixtures thereof.

7. An optical fiber array according to claim 1, wherein said release agent (C) is a mixture of a nonreactive silicone copolymer and a reactive acrylated silicone.

8. An optical fiber array according to claim 1, wherein said release agent (C) is acrylated silicone.

9. An optical fiber array according to claim 1, wherein said photoinitiator (D) is selected from the group consisting of hydroxycyclohexylphenyl ketone; hydroxymethylphenylpropanone; dimethoxyphenylacetophenone; 2-methyl-1-[4-(methyl thio) phenyl]-2-morpholino-propanone-1; 1-(4-isopropylphenyl)-2-hydroxy-2-methylpropan-1-one; 4-(2-hydroxyethyoxy) phenyl-(2-hydroxy-2-propyl) ketone; 1-(4-dodecyl phenyl)-2-hydroxy-2-methylpropan-1-one; diethoxyacetophenone; 2,2-di-sec-butoxy-acetophenone; diethoxyphenyl acetophenone; bis (2,6-dimethoxybenzoyl)-2,4-, 4-trimethylpentylphosphine oxide; 2,4,6-trimethylbenzoyldiphenylphosphine oxide; 2,4,6-trimethylbenzoylethoxyphenylphosphine oxide; and mixtures thereof.

10. An optical fiber array according to claim 1, additionally comprising from about 0.1 percent to about 2.0 percent by weight, based on total weight of (A), (B), (C) and (D), of a stabilizer or antioxidant (E) selected from the group consisting of tertiary amines; hindered amines; organic phosphites; hindered phenols; hydrocinnamates; propionates; and mixtures thereof.

11. An optical fiber array comprising
(1) inked and coated optical fibers, and
(2) a matrix, prepared by curing an homogeneous liquid ultraviolet radiation-curable matrix composition, for embedding and securing therein upon curing of said composition a plurality of inked and coated optical fibers in a desired configuration, in which said coated optical fibers are disposed in a desired relationship, applying said liquid matrix composition to said inked and coated optical fibers to embed them therein and then curing said liquid matrix composition by exposure to ultraviolet radiation to form a cured matrix, said liquid matrix composition comprising:

(A) from about 30 percent to about 80 percent by weight of a wholly aliphatic polyether based urethane acrylate;

(B) from about 10 percent to about 45 percent by weight of a reactive monomer selected from phenoxyethyl acrylate; phenoxyethyl methacrylate; hexanediol diacrylate; hexanediol dimethacrylate; polyethylene glycol nonylphenylether acrylate; stearyl acrylate; stearyl methylacrylate; and mixtures thereof;

(C) an amount from about 0.1 percent to about 10.0 percent by weight of a release agent which is a mixture of a nonreactive silicone copolymer and a reactive, acrylated silicone, which amount is not incompatible with said liquid matrix composition and which release agent is not in particulate form;

(D) from about 1.0 percent to about 6.0 percent by weight of a photoinitiator; and (E) from about 0.5 percent to about 1.5 percent by weight of a stabilizer or antioxidant;

all of said percentages by weight being based on the total weight of (A), (B), (C), (D) and (E);

wherein said liquid matrix composition is substantially free of N-vinyl pyrrolidone;

wherein said composition, when cured, has a tensile modulus at 25° of about 25,000 to about 175,000 psi (about 170 Mpa to about 1,200 Mpa);

wherein said composition, when cured, has an elongation to break of at least 40%;

wherein said cured matrix is strippable, without being dissolved, from the ink on said inked and coated fibers in a substantially intact unit and substantially without removing said ink from said fibers; and wherein said composition, when cured, is substantially free of particulate material.

12. An optical fiber array comprising
(1) inked and coated optical fibers, and
(2) a matrix, prepared by curing an homogeneous liquid radiation-curable matrix composition for embedding and securing therein upon curing of said composition a plurality of inked and coated optical fibers in a desired configuration, in which said inked and coated optical fibers are disposed in a desired relationship to each other, to form a unitary structure, said structure being produced by arranging said inked and coated optical fibers in said desired relationship, applying said liquid matrix composition to said coated optical fibers to embed them therein and then curing said liquid matrix composition by exposure to curing radiation, said liquid matrix composition comprising:

(A) from about 50 percent to about 75 percent by weight of an aliphatic polyether-based urethane acrylate;
(B1) from about 8.0 percent to about 30.0 percent by weight of phenoxyethylacrylate;
(B2) from about 2.0 percent to about 10 percent by weight of 1,6-hexanediol diacrylate;
(C1) from about 0.1 percent to about 1.0 percent by weight of an alkyl-pendant silicone copolymer;
(C2) from about 0.05 percent to about 10.0 percent by weight of an acrylic functional polyester modified dimethylsiloxane;
(D) from about 1.0 percent to about 6.0 percent by weight of hydroxycyclohexylphenyl ketone photoinitiator; and
(E) from about 0.5 percent to about 1.5 percent by weight of thiodiethylene bis (3,5-di-tert-butyl-4-hydroxy) hydrocinnamate;
all of said percentages by weight being based on total weights of (A), (B1), (B2), (C1), (C2), (D) and (E).

13. A process for preparing an optical fiber ribbon assembly comprising:
mechanically arranging coated and inked optical fibers in a generally parallel arrangement;
applying about said fibers the liquid matrix composition of claim 1; and
curing said liquid matrix composition, thereby securing said fibers in said arrangement.

14. A process according to claim 13, wherein said composition comprises a photoinitiator, and said curing is effected via ultraviolet irradiation.

15. A process according to claim 13, wherein said composition is substantially free of photoinitiator, and said curing is effected via electron beam irradiation.

16. A process for preparing an optical fiber ribbon assembly comprising:
mechanically aligning coated and inked optical fibers in a generally parallel disposition relative to each other;
applying about said fibers the liquid matrix composition of claim 1; and
curing said liquid matrix composition, thereby securing said fibers in said disposition.

17. A process according to claim 16, wherein said composition comprises a photoinitiator, and said curing is effected via ultraviolet irradiation.

18. A process according to claim 16, wherein said curing is effected via electron beam irradiation.

19. A process comprising removing a bonded ribbon cured matrix from a coated and inked optical fiber present in an optical fiber array, such that the cured matrix is removed without damage to the integrity of itself or the underlying coated and inked fiber, said cured matrix comprising the radiation-cure reaction product of a homogeneous liquid composition comprising (A) from about 20.0 percent to about 90.0 percent by weight of a wholly aliphatic urethane acrylate oligomer;
(B) from about 5.0 percent to about 50.0 percent by weight of a reactive monomer having one or more acrylate or methacrylate moieties per monomer molecule;
(C) an amount from about 0.05 percent to about 15.0 percent by weight of a release agent which amount is not incompatible with said liquid composition and which release agent is not in particulate form; and
(D) from about 0 percent to about 10 percent by weight of a photoinitiator;
all of said percentage by weight being based on total weight of (A), (B), (C) and (D),
wherein said composition is substantially free of n-vinyl pyrrolidone;
wherein said cured matrix has a tensile modulus at 25° C. of about 10,000 to about 200,000 psi (about 70 MPa to about 1,400 MPa);
wherein said cured matrix has an elongation to break of at least 20%;
wherein cured matrix is strippable, without being dissolved, from the ink on said inked and coated fibers and substantially without removing said ink from said fibers; and
wherein said cured matrix is substantially free of particulate material.

20. A process according to claim 19, wherein said cured matrix is removable in an intact unit.

21. A process comprising removing a bonded ribbon cured matrix from a coated and inked optical fiber present in an optical fiber array, such that the cured matrix is removed without damage to the integrity of itself or an underlying coated and inked fiber, said cured matrix comprising the radiation-cure reaction product of a homogeneous liquid composition comprising (A) from about 30 percent to about 80 percent by weight of a wholly aliphatic polyether-based urethane acrylate;
(B) from about 10 percent to about 45 percent by weight of a reactive monomer having a plurality of acrylate or methacrylate moieties per monomer molecule selected from phenoxyethyl acrylate; phenoxyethyl methacrylate; hexanediol diacrylate; hexanediol dimethacrylate; and mixtures thereof;
(C) from about 0.1 percent to about 10.0 percent by weight of a mixture of a nonreactive silicone copolymer and a reactive acrylated silicone;
(D) from about 1.0 percent to about 6.0 percent by weight of a photoinitiator; and
(E) from about 0.5 percent to about 1.5 percent by weight of a stabilizer or antioxidant;
all of said percentages by weight being based on the total weight of (A), (B), (C), (D) and (E);
wherein said composition is substantially free of n-vinyl pyrrolidone;
wherein said cured matrix has a tensile modulus at 25° C. of about 25,000 to about 175,000 psi (about 170 MPa to about 1,200 MPa);

wherein said cured matrix has an elongation to break of at least 40%;

wherein said cured matrix is strippable, without being dissolved, from the ink on said inked and coated fibers and substantially without removing said ink from said fibers; and wherein said cured matrix is substantially free of particulate material.

22. A process according to claim 21, wherein said cured matrix is removable in an intact unit.

* * * * *